US010206122B2

(12) United States Patent
Wang et al.

(10) Patent No.: US 10,206,122 B2
(45) Date of Patent: Feb. 12, 2019

(54) DIRECTION FINDING POSITIONING IN WIRELESS LOCAL AREA NETWORKS

(71) Applicants: MEDIATEK INC., Hsin-Chu (TW); James June-Ming Wang, San Marino, CA (US); Jianhan Liu, San Jose, CA (US); Thomas Edward Pare, Jr., Mountain View, CA (US); Tianyu Wu, San Jose, CA (US); Gabor Bajko, Santa Clara, CA (US); Yung-Ping Hsu, Taipei (TW)

(72) Inventors: James June-Ming Wang, San Marino, CA (US); Jianhan Liu, San Jose, CA (US); Thomas Edward Pare, Jr., Mountain View, CA (US); Tianyu Wu, San Jose, CA (US); Gabor Bajko, Santa Clara, CA (US); Yung-Ping Hsu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 133 days.

(21) Appl. No.: 15/121,044

(22) PCT Filed: Feb. 24, 2015

(86) PCT No.: PCT/US2015/017174
§ 371 (c)(1),
(2) Date: Aug. 24, 2016

(87) PCT Pub. No.: WO2015/130618
PCT Pub. Date: Sep. 3, 2015

(65) Prior Publication Data
US 2017/0070893 A1   Mar. 9, 2017

Related U.S. Application Data (60) Provisional application No. 61/944,153, filed on Feb. 25, 2014, provisional application No. 61/950,925, (Continued)

(51) Int. Cl.
*H04W 16/22* (2009.01)
*G01S 3/74* (2006.01)
(Continued)

(52) U.S. Cl.
CPC ............ *H04W 16/225* (2013.01); *G01S 1/08* (2013.01); *G01S 3/14* (2013.01); *G01S 3/74* (2013.01);
(Continued)

(58) Field of Classification Search
CPC ..... H04W 16/225; H04W 4/023; H04W 4/02; H04W 24/10; H04W 64/00; H04W 4/043;
(Continued)

(56) References Cited

U.S. PATENT DOCUMENTS 6,947,734 B1   9/2005   Toubassi
8,244,174 B1 *  8/2012   Kong ................... G01S 1/725
                                                              455/25

(Continued)

FOREIGN PATENT DOCUMENTS

EP   2 680 033 A1   1/2014
WO   2012156570 A1   11/2012

OTHER PUBLICATIONS

"International Search Report" dated Jun. 1, 2015 for International application No. PCT/US15/17174, International filing date:Feb. 24, 2015.

(Continued)

*Primary Examiner* — Michael Y Mapa
(74) *Attorney, Agent, or Firm* — Winston Hsu

(57) ABSTRACT

A method of direction finding (DF) positioning in a wireless location area network (WLAN) is proposed. A multiple antenna IEEE 802.11 transmitting device can transmit signal preamble containing multiple Long Training Field (LTF) symbols in a radio frame from multiple antennas simultaneously, which allows a receiving device to resolve multiple DF sounding signals transmitted from the multiple antennas. As a result, angle of departure (AoD) of the transmitting device can be estimated by using the multiple resolved DF sounding signals from each antenna for DF positioning purpose.

22 Claims, 10 Drawing Sheets

Related U.S. Application Data filed on Mar. 11, 2014, provisional application No. 62/082,224, filed on Nov. 20, 2014.

(51) Int. Cl.

| | | |
|---|---|---|
| *G01S 3/14* | (2006.01) | |
| *G01S 5/12* | (2006.01) | |
| *G01S 1/08* | (2006.01) | |
| *H04L 5/00* | (2006.01) | |
| *H04L 29/06* | (2006.01) | |
| *H04B 7/06* | (2006.01) | |
| *H04B 17/318* | (2015.01) | |
| *G01S 5/06* | (2006.01) | |
| *H04W 4/02* | (2018.01) | |
| *G01S 5/02* | (2010.01) | |
| *H04W 24/10* | (2009.01) | |
| *H04W 64/00* | (2009.01) | |
| *H04W 4/04* | (2009.01) | |
| *H04W 84/12* | (2009.01) | |

(52) U.S. Cl.
CPC ............ *G01S 5/0252* (2013.01); *G01S 5/06* (2013.01); *G01S 5/12* (2013.01); *H04B 7/0617* (2013.01); *H04B 17/318* (2015.01); *H04L 5/005* (2013.01); *H04L 5/0048* (2013.01); *H04L 69/22* (2013.01); *H04W 4/02* (2013.01); *H04W 4/023* (2013.01); *H04W 24/10* (2013.01); *H04W 64/00* (2013.01); *H04W 4/043* (2013.01); *H04W 84/12* (2013.01)

(58) Field of Classification Search
CPC .. H04W 84/12; G01S 3/74; G01S 3/14; G01S 5/12; G01S 1/08; G01S 5/06; G01S 5/0252; H04L 5/005; H04L 69/22; H04L 5/0048; H04B 7/0617; H04B 17/318
USPC ...................... 455/446, 456.1–457
See application file for complete search history.

(56) References Cited

U.S. PATENT DOCUMENTS

| | | | |
|---|---|---|---|
| 2003/0140771 A1 | 7/2003 | Ohshima | |
| 2005/0276347 A1* | 12/2005 | Mujtaba | H04B 7/0667 375/299 |
| 2007/0021075 A1* | 1/2007 | Nakao | H04B 7/0671 455/101 |
| 2007/0197229 A1 | 8/2007 | Kalliola | |
| 2008/0051145 A1 | 2/2008 | Jin | |
| 2008/0258562 A1 | 10/2008 | Fagg | |
| 2010/0106440 A1 | 4/2010 | Richmond | |
| 2010/0302102 A1 | 12/2010 | Desai | |
| 2011/0075607 A1 | 3/2011 | Kim | |
| 2012/0195285 A1* | 8/2012 | Ko | H04J 13/00 370/330 |
| 2012/0327914 A1 | 12/2012 | Kang | |
| 2013/0188538 A1 | 7/2013 | Kainulainen | |
| 2013/0223427 A1* | 8/2013 | Sohn | H04W 74/06 370/338 |
| 2013/0260688 A1 | 10/2013 | Palin | |
| 2013/0303184 A1 | 11/2013 | Yang | |
| 2014/0187259 A1* | 7/2014 | Kakani | H04W 64/00 455/456.1 |
| 2014/0301219 A1* | 10/2014 | Ben-Haim | G01S 5/14 370/252 |
| 2015/0016379 A1* | 1/2015 | Nam | H04B 7/0456 370/329 |
| 2015/0181553 A1 | 6/2015 | Segev | |
| 2015/0256373 A1* | 9/2015 | Huang | H04L 5/0066 375/260 |

OTHER PUBLICATIONS

"International Search Report" dated Jun. 3, 2015 for International application No. PCT/US15/17391, International filing date:Feb. 24, 2015.
Hanqing Lou et al., A Comparison of Implicit and Explicit Channel Feedback Methods for MU-MIMO WLAN Systems, InterDigital Communications, LLC, XP055299650, 2013 IEEE 24th Annual International Symposium on Personal, Indoor, and Mobile Radio Communications (PIMRC), Sep. 1, 2013, pp. 419-424.

\* cited by examiner (PRIOR ART)
FIG. 1A (PRIOR ART)
FIG. 1B

NDP ANNOUNCEMENT FRAME

FIG. 10

FTM REQUEST FRAME

FIG. 11

| CATEGORY | PUBLIC ACTION | DIALOG TOKEN | FOLLOW UP DIALOG TOKEN | TOD | TOA |

1210

| MAX TOD ERROR | MAX TOA ERROR | OPTIONAL FTM PARAMETER ELEMENT |

FTM RESPONSE FRAME WITH AOA ESTIMATE

FIG. 12

COMBINED AOA AND FTM

DIRECTION FINDING POSITIONING IN WIRELESS LOCAL AREA NETWORKS

CROSS REFERENCE TO RELATED APPLICATIONS

This application claims priority under 35 U.S.C. § 119 from U.S. Provisional Application No. 61/944,153 entitled "Direct Finding Locationing for WiFi," filed on Feb. 25, 2014; U.S. Provisional Application No. 61/950,925 entitled "Protocol for WiFi Direct Finding Positioning," filed on Mar. 11, 2014; U.S. Provisional Application No. 62/082,224 entitled "Direction Finding Positioning: Additional Waveform for AoD," filed on Nov. 20, 2014, the subject matter of which is incorporated herein by reference.

TECHNICAL FIELD

The disclosed embodiments relate generally to local wireless area network (WLAN) communications, and, more particularly, to direct finding and positioning in wireless local area networks (WLANs).

BACKGROUND

IEEE 802.11 is a set of media access control (MAC) and physical layer (PHY) specification for implementing wireless local area network (WLAN) communication, in the unlicensed (2.4, 5, and 60 GHz) frequency bands. The standards and amendments provide the basis for wireless network products using the IEEE 802.11 frequency bands. IEEE 802.11 plays an important role in the growing application of Indoor/Outdoor Location. The key applicable technology is that of ranging using time-of-flight (TOF) ranging measurements defined in IEEE 802.11v. Once the distance between devices is measured, the information can be used to determine device location.

In IEEE 802.11-REVmc, Fine Timing Measurement (FTM) protocol is proposed for Indoor Location. Based on FTM, an initiating station exchanges FTM frames during an FTM session with a responding station to measure the time-of-flight (TOF) or the Round Trip Delay (RTD/2). The initiating station then computes its range to the responding station after receiving timing measurements (i.e., timestamps corresponding to the departure time and arrival time of the FTM frames) from the responding station. To calculate a station position, the station performs ranging measurements with multiple access points (APs) via FTM frame exchange and obtains AP's positions. FTM positioning requires the initiating station to exchange FTM frames with multiple responding APs for TOF measurements in order to determine its absolute location. For 3D positioning, the station needs to exchange FTM frames with four or more APs in order to determine its absolute location.

Figure 1A:
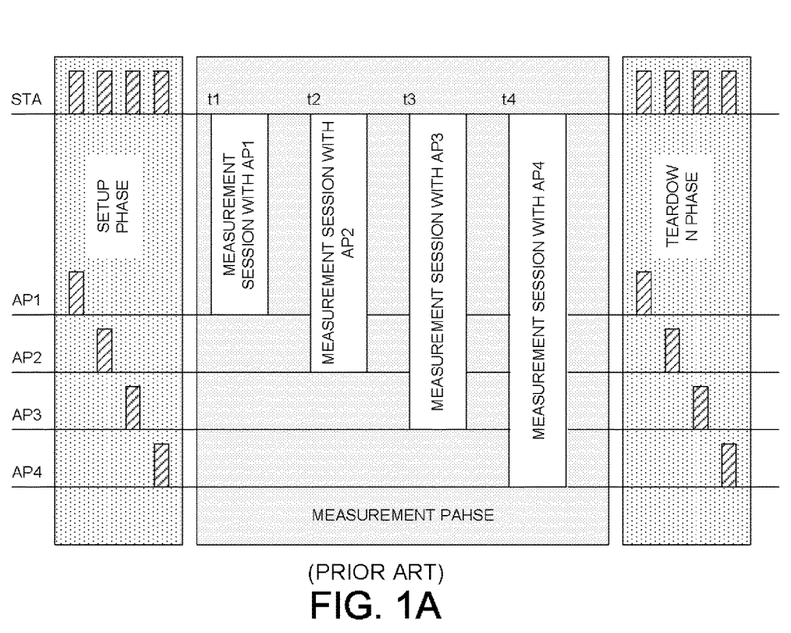
FIG. 1A (Prior Art) illustrates conceptually an FTM positioning procedure.

FIG. 1 (Prior Art) illustrates conceptually an FTM positioning procedure. As illustrated in FIG. 1, the FTM positioning procedure starts with a setup phase, followed with a measurement phase, and ended with a tear down phase. During the setup phase, the initiating station STA sends an FTM request or FTM requests to each of the responding APs, AP1-AP4, and wait for acknowledgments (ACKs) from AP1-AP4. In communicating with each responding AP, the initiating station STA might be required to switch to the operating channel of the responding AP if the station's current channel is different from the operating channels of the AP. The FTM request contains FTM related parameters including the start time and the duration of the subsequent FTM frame exchange. After the setup phase, the STA starts the measurement phase with each AP. During each measurement session, the STA exchanges FTM frames and obtains measurement results for TOF with each AP and thereby computing its distance to the corresponding AP. A dialog token carried within the FTM frame is used as an identification of the corresponding timestamp measurements at the AP and the STA. Timestamps and dialog token, which identifies the FTM (and ACK) frames in which timestamps are measured, are transferred together for use in range calculation. Again, channel switching between each measurement session may be needed if the wireless operating channels of the APs are different. After four measurement sessions with AP1-AP4 are completed, the STA is then able to determine its absolute location given the APs' positions. Finally, the STA and the APs go through a tear down phase to end the FTM positioning procedure if the tear down has not been specified during the set up phase.

Figure 1B:
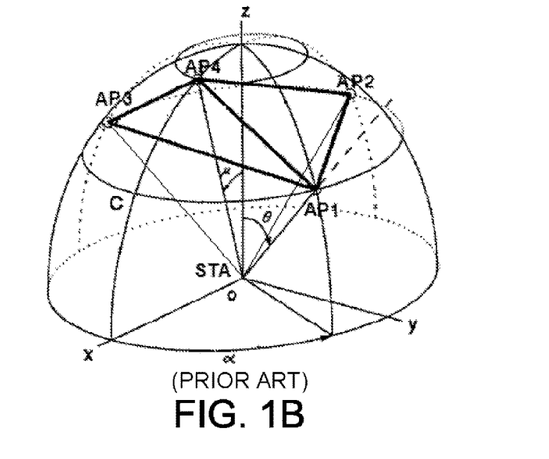
FIG. 1B (Prior Art) illustrates the geometry of AP positions.

FIG. 1B (Prior Art) illustrates the geometry of AP positions. As well known in the teaching of navigation science, the STA positioning error, obtained from processing the timing measurements, is related to the geometry of the AP positions. This is typically describes by a parameter call PDOP (Position of Dilation). The PDOP is inversely proportional to the volume of tetrahedron formed by unit directional vectors between AP and STA positions. To achieve low positioning error, it is necessary that APs be deployed at strategically selected positions within a coverage area.

The FTM protocol suffers from a list of drawbacks. First, the station possibly needs to switch to different channels in which the APs operate on. Second, the station needs to consume high power due to the long sessions of FTM frame exchange. Third, dense AP deployment is required to provide good coverage for supporting FTM positioning. Fourth, FTM traffic load increases when more stations perform positioning. The FTM protocol overhead can be substantial since all stations in a dense environment need to perform ranging independently. A solution for simplified Indoor Location operation to use single AP for positioning is sought.

SUMMARY

A method of direction finding (DF) positioning in a wireless location area network (WLAN) is proposed. A multiple antenna IEEE 802.11 transmitting device can transmit signal preamble containing multiple Long Training Field (LTF) symbols in a radio frame from multiple antennas, which allows a receiving device to resolve multiple DF sounding signals transmitted from the multiple antennas. As a result, angle of departure (AoD) of the transmitting device can be resolved by using the resolved signals from each antenna for DF positioning purpose. Furthermore, when the radial resolution error of AoD or AoA positioning increases, DF positioning and fine-timing measurement (FTM) ranging can be jointly applied to reduce the radial resolution error and extends the AoD/AoA service area with positing accuracy.

In one embodiment, a non-AP station receives a radio frame transmitted from an AP station via multiple antennas in a WLAN. The radio frame comprises a preamble having a plurality of long training field (LTF) symbols. The STA resolves a plurality of direction finding (DF) sounding signals corresponding to the multiple antennas. Each DF sounding signal contains a number of LTF symbols transmitted from each antenna of the AP. The STA estimates an angle of departure (AoD) based on the plurality of DF sounding signals. The STA then determines its location information based on the estimated AoD.

In another embodiment, a non-AP STA receives a plurality of DF sounding signals transmitted from an AP via multiple antennas in a WLAN. The STA estimates an angle of departure (AoD) based on the plurality of DF sounding signals. The STA determines a location of the STA based on the estimated AoD. The STA also performs an FTM ranging procedure with the AP and determines a distance between the STA and the AP if a radio resolution error of the AoD is larger than a threshold. The decision that the radial resolution error of AoD is larger than a threshold can be determined based on: 1) RSSI (received signal strength indicator); 2) range estimate obtained by FTM ranging; or 3) solved AoD estimate.

In yet another embodiment, a non-AP STA transmits a plurality of radio signals to an AP station having multiple antennas in a WLAN. The non-AP STA transmits an FTM request to the AP. The FTM request comprises an indication field of a predefined value to request the AP to provide the AoA of the non-AP STA. The non-AP STA performs an FTM ranging procedure with the AP to determine a distance between the STA and the AP. The non-AP STA receives an angle of arrival (AoA) of the STA from the AP for determining a location of the STA.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 2A:
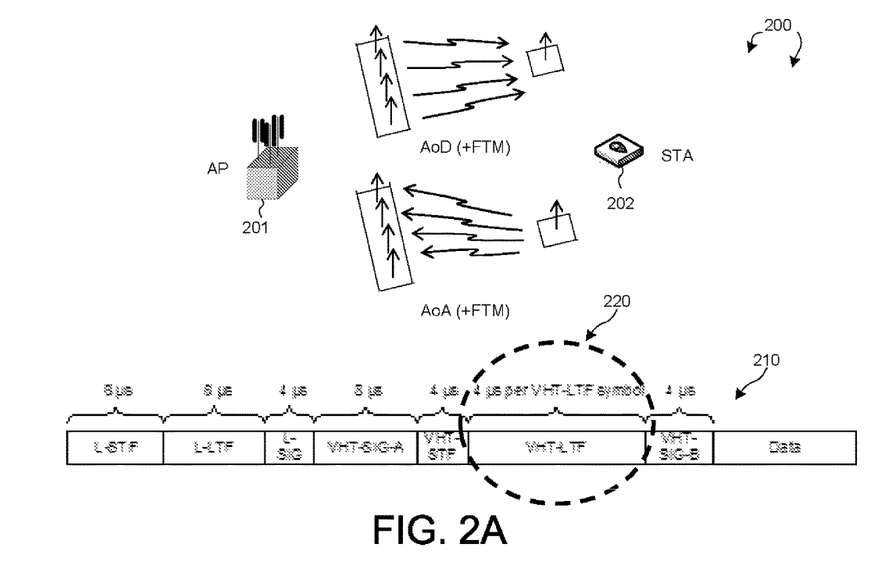
FIG. 2A illustrates a wireless local area network with direction finding positioning in accordance with one novel aspect.

FIG. 2A illustrates a wireless local area network (WLAN) 200 with direction finding (DF) positioning in accordance with one novel aspect. WLAN 200 comprises an access point AP 201 with multiple antennas and a non-AP station STA 202. In order for STA 202 to know its own location, direction finding positioning mechanism can be applied. Direction fining positioning is achieved from either Angle of Departure (AoD) or Angle or Arrival (AoA). In AoD, the transmitter transmits through multiple antennas and the receiver (tracker) resolves the angle of departure relative to the antenna platform of the transmitter based on the received signals. In AoA, the receiver (tracker) employs multiple antennas to receive signal and resolves angle of arrival relative to its own antenna platform orientation. In both AoD and AoA, only one device with multiple antennas is needed, and only one-way signal transmission is required.

In the example of FIG. 2A, in AoD, AP 201 is the transmitter that transmits through multiple antennas and the receiver STA 202 resolves AoD relative to the antenna platform of the AP based on the received signals. STA 202 is then able to determine its location based on the AoD and the AP location, the AP antenna platform orientation information, antenna position on the platform, and/or antenna spatial signature. For those well versed in the art, the antenna spatial signature is the signal characteristics associated different AoD directions, typically, generated by a certain arrangement of antenna polarizations and patterns on the antenna platform. In AoA, AP 201 is the receiver that employs multiple antennas to receive signal from STA 202 and resolves AoA relative to its antenna platform after STA 202 continue to transmit signal to AP 201. AP 201 is then able to track the position of STA 202.

In accordance with one novel aspect, a multiple antenna IEEE 802.11 transmitting device can transmit signal preamble containing multiple Long Training Field (LTF) symbols 220 in PPDU 210, which allows a receiving device to resolve signals from the multiple antennas. As a result, AoD of the transmitting device can be solved by using the resolved signals from each antenna for direction finding positioning purpose. Furthermore, when the radial resolution error of AoD or AoA positioning increases, DF positioning and fine-timing measurement (FTM) ranging can be jointly applied to reduce the radial resolution error and extends the AoD/AoA service area.

Figure 2B:
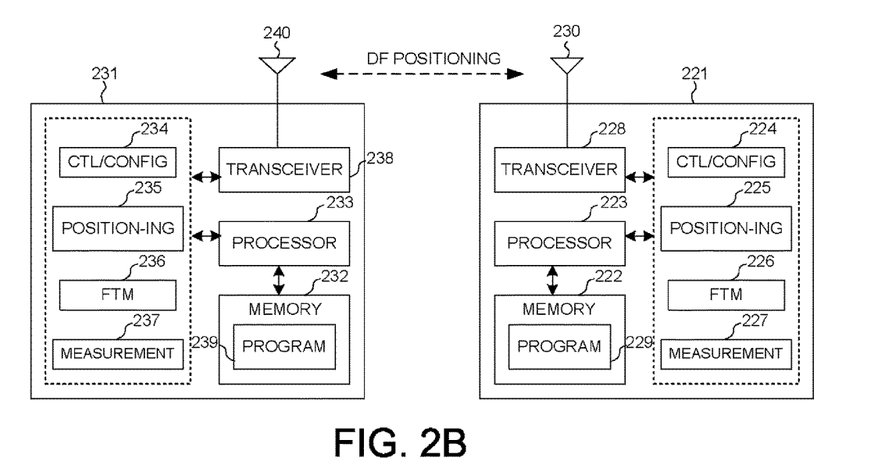
FIG. 2B is a simplified bock diagram of an initiating device and a responding device that carry out certain embodiments of the invention.

FIG. 2B is a simplified bock diagram of an initiating device 221 and a responding device 231 that carry out certain embodiment of the invention. The initiating device is referred to as an initiator, and the responding device is referred to as a responder. Both devices can be an AP station or a non-AP station. Initiating device 221 comprises memory 222, a processor 223, a control and configuration module 224, a positioning module 225, an FTM module 226, and a measurement module 227, and a transceiver 228 coupled to antenna 230. Similarly, responding device 231 comprises memory 232, a processor 233, a control and configuration module 234, a positioning module 235, an FTM module 236, a measurement module 237, and a transceiver 238 coupled to antenna 240. In the transmitting direction, the transceiver converts the baseband signals from the processor to RF signals and sends out to the antenna. In the receiving direction, the processor processes the received baseband signals from the transceiver and invoke different functional modules to perform various features and embodiments supported by the wireless devices.

The different modules are functional modules that can be implemented and configured in software, firmware, hardware, or any combination thereof. The function modules, when executed by processors 223 and 233 (via program instructions 229 and 239 contained in memory 222 and 232), interwork with each other to allow the wireless devices to perform enhanced channel access. For example, the measurement module performs FTM measurement frame timing measurements and other radio signals for estimating AoD/AoA, the FTM module establishes the FTM procedure involving setup phase, measurement phase, and tear down phase, the positioning module determines the location of the wireless device based on the FTM measurement result and/or AoD/AoA estimations, and the control and configuration module configures AoD/AoA/FTM related parameters and controls the corresponding AoD/AoA/FTM positioning procedures.

Figure 3:
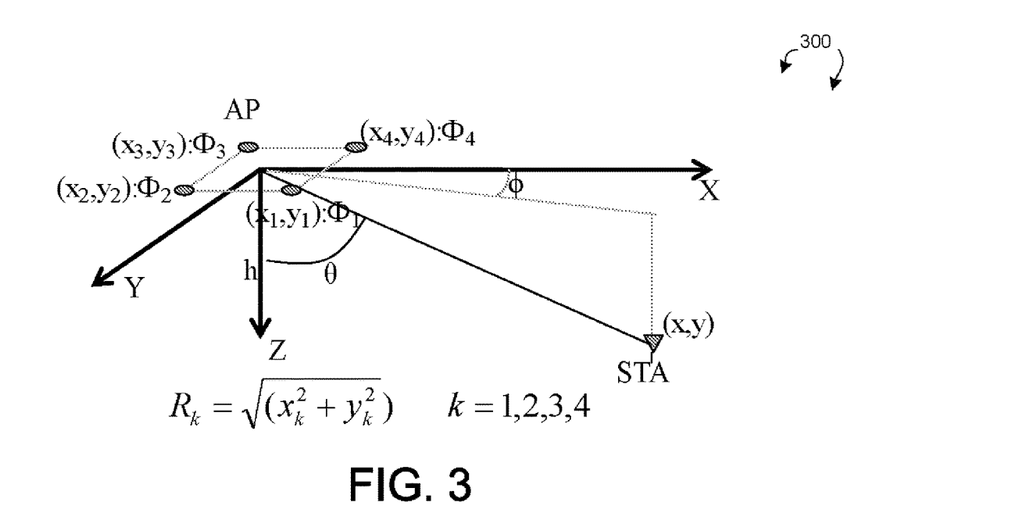
FIG. 3 illustrates direction finding based on angle of departure (AoD) estimation.

FIG. 3 illustrates direction finding based on angle of departure (AoD) estimation. In the example of FIG. 3, an AP is located above the floor with height h, and having four antennas have the same height as the AP, while an STA is located on the floor. The four AP antennas are indexed by (k=1, 2, 3, 4), and each antenna had its location corresponding to $(x_k, y_k)$ or $(R_k, \phi_k)$, where $(x_k, y_k)$ indicates the X-Y plane coordinates of each antenna, $R_k$ indicates the distance to the X-Y plane origin and $\phi_k$ indicates the angle from X-axis of each antenna. The STA location can be represented by its X-Y plane coordinates (h, x, y) or (r, θ, φ), where r indicates the STA distance to the AP, θ is the STA angle to Z-axis, and φ is the STA angle from X-axis.

The AP transmits radio signals to the STA via four antennas, and the STA estimates the AoD from the received signals transmitted from the four antennas of the AP. The STA received signals $r_k(t)$ transmitted from antenna k of S(t) with noise $n_k(t)$ can be represented as:

$$r_k(t) = e^{-j\frac{2\pi R_k}{\lambda}\cos(\phi - \Phi_k)\sin\theta} \cdot s(t) + n_k(t)$$

and:

$$-h = r*\cos(\theta)$$
$$-x = r*\sin(\theta)*\cos(\phi)$$
$$-y = r*\sin(\theta)*\sin(\phi)$$

As a result, the STA location (x, y) can be solved using θ and φ if the AP antenna locations, antenna platform orientation, and the height h (relative to the floor) are known. Algorithms such as Bartlett Beamformer or the classic MUSIC algorithm can be used to solve AoD.

Figure 4:
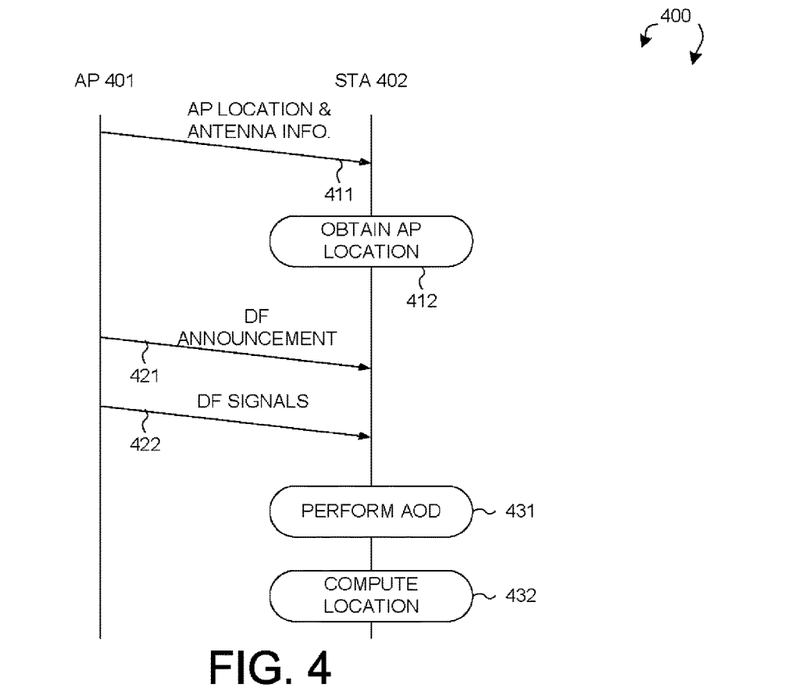
FIG. 4 illustrates a procedure of direction finding positioning based on AoD.

FIG. 4 illustrates a procedure of direction finding positioning based on AoD in a wireless local area network (WLAN) 400. WLAN 400 comprises an AP 401 with multiple antennas and a station STA 402. For example, AP 401 with multiple antenna platform is deployed in strategic location such as ceiling or wall in a venue. In step 411, AP 401 transmits broadcasting signals containing its location information, antenna platform orientation information, antenna position and/or antenna spatial signature information. In step 412, STA 402 obtains the broadcasted information. Note that STA 402 may use other method, e.g., sending a request to AP, to obtain AP location, antenna platform orientation, and antenna position and/or spatial signature information. In step 421, AP 401 transmits a direction finding announcement signal indicating the immediate subsequent direction finding sounding signals for DF positioning. In step 422, AP 401 transmits the DF sounding signals simultaneously via the multiple antennas, while STA 402 receives the DF sounding signals. Note that if the AP contains a high number of antennas, the AP can transmit multiple sets of DF sounding signals after the announcement in multiple time slots where each set of DF sounding signals is transmitted via a different set of antennas. Combining switched antenna transmission and simultaneous transmission can limit the number of resolvable LTF symbols in each set of DF sounding signals. In step 431, STA 402 performs AoD estimation based on the received DF sounding signals. Finally, in step 432, STA 402 computes its STA location based on the estimated AoD and the AP location, AP antenna platform orientation, antenna position, and/or spatial signature information.

In order to apply AoD positioning, the receiver (tracker) needs to be able to resolve the received radio signals transmitted from the multiple antennas of the same transmitter. In a switched antenna implementation, a multiple antenna AP transmits through different antennas at different time slots. The receiver then estimates the relative signal phases of antennas at different time slots to compute the AoD. In contrast to the switched antenna implementation, IEEE 802.11 devices have been using multiple antennas simultaneously for transmitting or receiving radio signals (e.g., MIMO, STBC). Therefore, it is desirable that AoD positioning can be implemented by IEEE 802.11 devices using multiple antennas simultaneously for transmitting or receiving based on existing radio signal waveforms. However, in order to limit the number of antennas transmit simultaneously, the combined switched antenna implementation and the simultaneous transmission via multiple antennas can be used.

Figure 5:
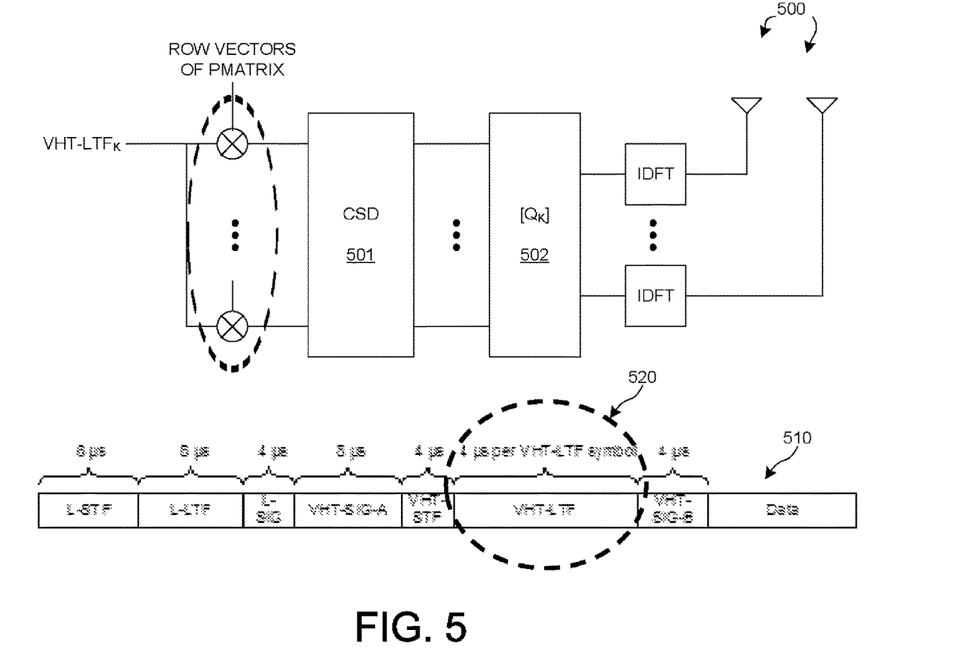
FIG. 5 illustrates one embodiment of AoD positioning in IEEE 802.11.

FIG. 5 illustrates one embodiment of AoD positioning by a transmitter 500 in IEEE 802.11. IEEE 802.11ac signal consists of OFDM symbols, which can be 20 MHz, 40 MHz, 80 MHz, or 160 MHz bandwidth. FIG. 5 shows an IEE 802.11ac PPDU 510, which contains L-STF, L-LTF, L-SIG, VHT-SIG-A, VHT-STF, VHT-LFT, VHT-SIG-B, and VHT data fields, each field can have one or multiple OFDM symbols. Each PPDU consists of $N_{STS\text{-}Total}$ VHT-LTF symbols 520. In one embodiment of AoD positioning, a P matrix ($N_{VHTLTF} \times N_{VHTLTF}$) is introduced. The P matrix consists of a number of orthogonal row vectors, where $N_{VHTLTF}$ is the number of LTF symbols. At the transmitter side, non-pilot tones of each VHT-LTF symbol (n=0, 1 ... $N_{VHTLTF}-1$) in a transmit antenna chain are multiplied by an entry from the row vector of the P matrix, for each $k^{th}$ subcarrier. The radio signal might be further processed by a cyclic shift delay CSD 501, a beamforming/precoding module 502 having precoding matrix [$Q_k$], multiple IDFTs, and then simultaneously transmitted from the antennas.

At the receiver side, the radio signal from each transmit antenna is recovered by the inner product of the corresponding row vector of the P matrix and the received LTF symbols. Note that the row vectors of the P matrix are orthogonal to each other. When a receiver multiplies the received LTF symbols with a row vector and sum these symbols together, it recovers the LTF symbols are used to resolve the signals for different antennas. For each antenna, a row vector of the P matrix is used to multiply the LTF symbols in time domain (one entry of the row vector for each LTF symbol). Because the row vectors in the P matrix are orthogonal vectors, the receiver can recover signal from each antenna by using the inner product of a corresponding row vector and the received LTF symbols.

Different row vectors are used for different antennas. The number of entries in the row vector is equal to the number of LTF symbols and is greater or equal to the number of antennas. The number of entries corresponding to the number of antennas is based on a predefined rule for a resolvable P matrix. In IEEE 802.11ac, the number of (simultaneous transmitting) antennas and the dimension of the P matrix is chosen from the following 2-tuples (1,2), (2,2), (3,4), (4,4), (5,6), (6,6), (7,8), (8,8) where the first entry is the number of antennas and the second entry is the $N_{VHTLTF}$. In another embodiment, any set of orthogonal vectors can be used to resolve LTF symbols.

Figure 6:
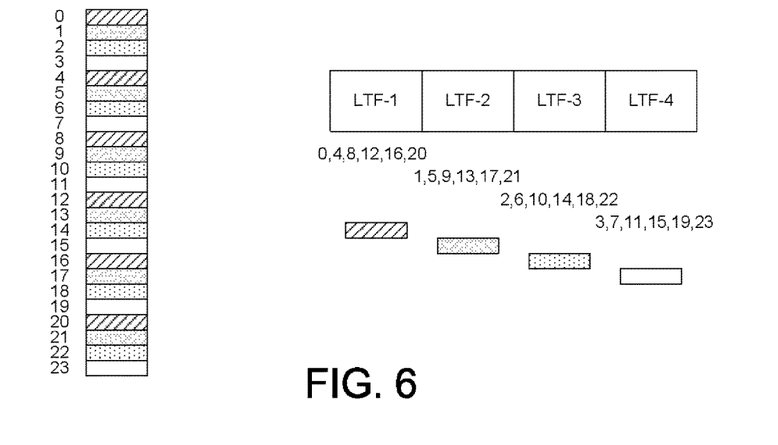
FIG. 6 illustrates another embodiment of AoD positioning in IEEE 802.11.

FIG. 6 illustrates another embodiment of AoD positioning in IEEE 802.11. Assume the number of LFT symbols is equal to the number of antennas. At the transmitter side, each LTF symbol contains groups of interleaving subcarrier tones, and different groups of subcarrier tones are allocated to different antennas to form an interleaved LTF waveform for transmission. Note that different groups of subcarrier tones do not overlap each other in a LTF symbol. At the receiver side, each DF sounding signal is resolved by processing a corresponding group of subcarrier tones to extract the DF sounding signal transmitted from each antenna.

After the receiver resolves the LTF symbols from each antenna, the receiver can use the super-resolution method such as MUSIC to resolve AoD. Alternatively, the receiver resolves the LTF symbols from each antenna and uses the spatial signature of the antenna signals corresponding to each AoD angle to solve AoD. A spatial signature from a set of spatial signatures at the receiver best matches the received spatial signature determines the AoD estimate.

Figure 7:
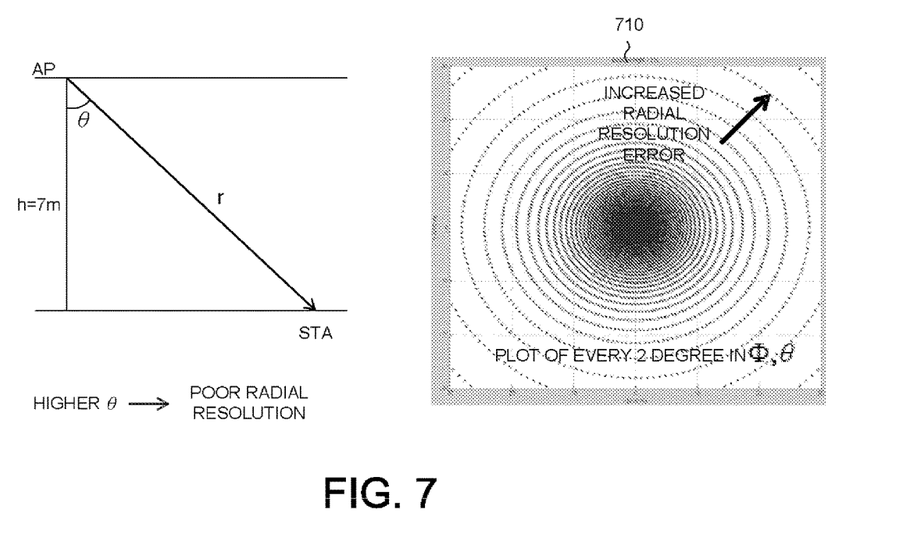
FIG. 7 illustrates the radio resolution error of AoD positioning.

FIG. 7 illustrates the radial resolution error of AoD positioning. DF positioning based on AoD estimation is not always accurate. The position accuracy depends on the STA location, e.g., how far is the STA with respect to the AP (distance r), especially depends on an offset angle of the STA relative to an antenna boresight of the antenna platform of the AP. If the antenna platform is horizontal, then the boresight is vertical and the offset angle is referred to as the elevation angle. In the example of FIG. 7, assuming the AP is deployed on the ceiling (h=7 meters) and has four antennas positioned at four corners of a 10 inch×10 inch platform. The distance from the STA to the AP is denoted as r, and the offset angle is denoted as angle S. As depicted by diagram 710 in FIG. 7, the radial resolution error increases as S increases. Moreover, the radio resolution error increases rapidly with reduced dilution of precision at higher θ angles, e.g., when θ>60-70 degree.

Figure 8:
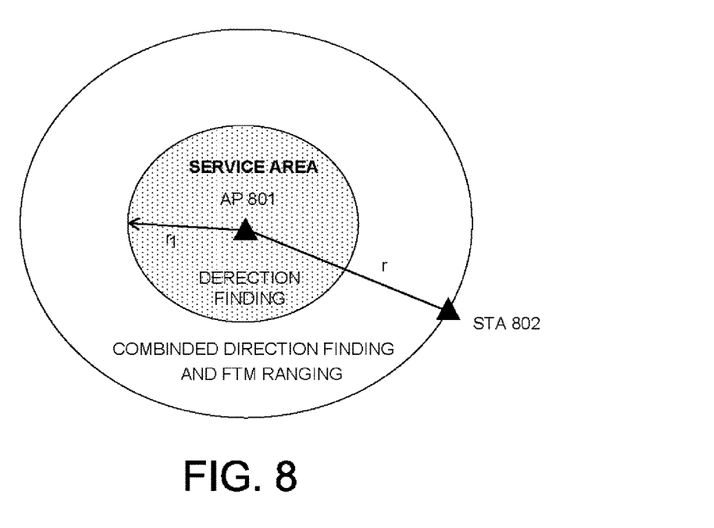
FIG. 8 illustrates the concept of combining AoD positioning with FTM ranging.

FIG. 8 illustrates the concept of combining AoD positioning with FTM ranging. In the example of FIG. 8, the distance between AP 801 and STA 802 is r. The AoD service area is covered with a radius of r1. Beyond the AoD service area, the radial resolution error of AoD becomes too high so that the location determination is no longer accurate. In accordance with one novel aspect, if STA 802 is located within the inner circle (e.g., the shaded area) when (r<r1), then STA 802 uses AoD to determine its position. On the other hand, if STA 802 is located outside the inner circle, then STA 802 uses both FTM ranging and AoD estimates to determine its position. In another example, if the STA offset angle S is larger than 60 degrees, then the STA uses both FTM ranging and AoD estimates to determine its position. With combined FTM ranging and AoD, STA 802 uses AoD to determine the azimuth direction φ, and the radial distance r of the STA is determined by FTM ranging.

Figure 9:
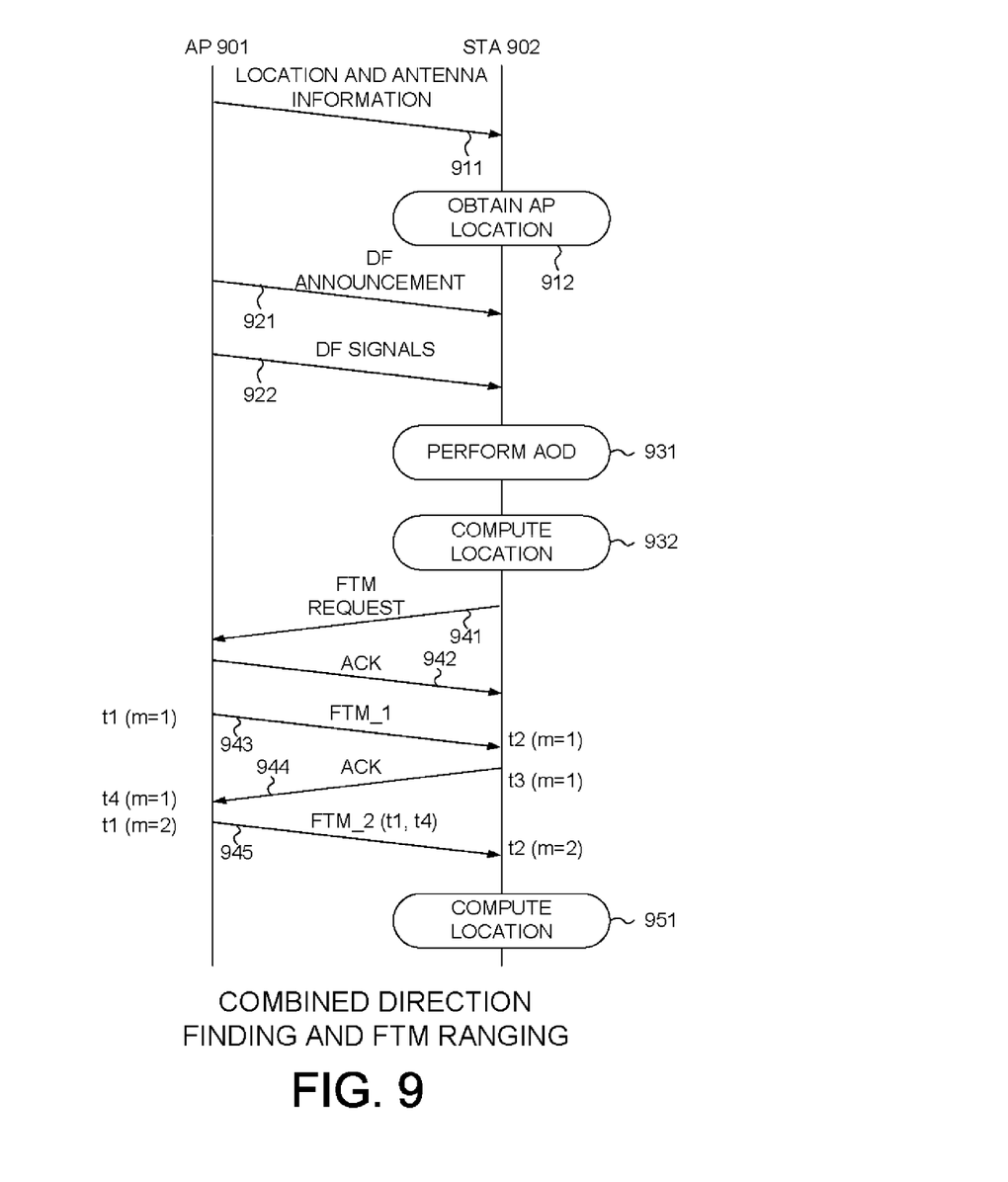
FIG. 9 illustrates a procedure of combined AoD direction finding positioning and FTM ranging.

FIG. 9 illustrates a procedure of combined AoD direction finding positioning and FTM ranging in a wireless local area network (WLAN) 900. WLAN 900 comprises an AP 901 with multiple antennas and a station STA 902. In step 911, AP 901 transmits location information, antenna platform orientation information, and antenna position and/or spatial signature information to STA(s) either unsolicited or solicited. In step 912, STA 902 obtains the location information, antenna platform orientation information, and antenna position and/or spatial signature information. In step 921, AP 901 transmits a direction finding announcement signal indicating the immediate subsequent one or multiple set of direction finding sounding signals for DF positioning. In step 922, AP 901 transmits the DF sounding signals via the multiple antennas, while STA 902 receives the DF sounding signals. In step 931, STA 902 performs AoD estimation based on the received DF sounding signals. In step 932, STA 902 computes its STA location based on the estimated AoD and the AP location, AP antenna platform orientation, and antenna position and/or spatial signature information.

If STA 902 is located outside of the AoD service area or if the STA offset angle S relative to the AP antenna boresight is larger than e.g., 60 degrees, then the AoD radial resolution error is too high. As a result, STA 902 further performs FTM ranging to improve the positioning accuracy. In step 941, STA 902 initiates an FTM procedure by sending an FTM request to AP 901. In step 942, AP 901 accepts the FTM request and sends an ACK frame back to STA 902. In step 943, AP 901 transmits a first FTM measurement frame FTM_1 at time instance t1 (m=1), which denotes the first measurement session. STA 902 receives FTM_1 at time instance t2 (m=1). In step 944, STA 902 transmits an ACK frame to AP 901 at time instance t3 (m=1). AP 901 receives the ACK frame at time instance t4 (m=1). In step 945, AP 901 transmits a second FTM measurement frame FTM_2 at time instance t1 (m=2), denotes the second measurement session. FTM_2 payload also includes the timestamps t1 and t4 of the first measurement session. STA 902 receives FTM_2 at time instance t2 (m=2). Based on the FTM measurement results, STA 902 computes the time-of-flight (TOF) or Round Trip Delay (RTD/2) and its corresponding range/distance to AP 901. Finally, STA 902 updates its location information based on both AoD and FTM.

In another embodiment, the STA performs FTM first to determine it distance from AP and then performs AoD subsequently. For example, the FTM frames during the FTM ranging contain multiple long training field (LTF) symbols for the subsequent AoD estimate, and the subsequent AoD is indicated by an indicator in an FTM frame set to a predetermined value.

Figure 10:
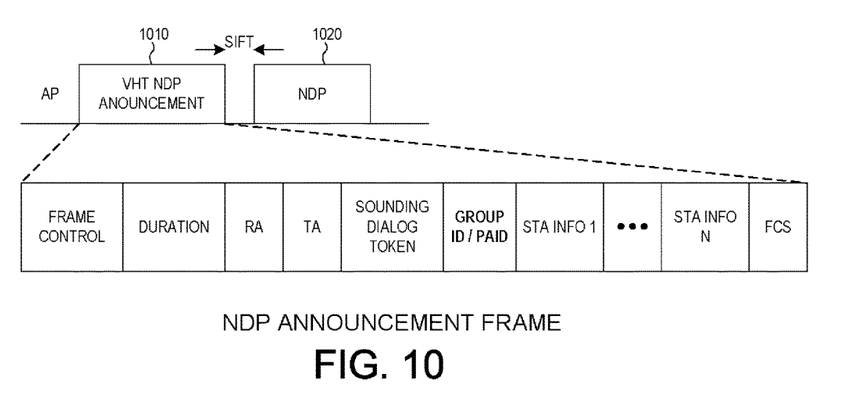
FIG. 10 illustrates a null data packet (NDP) announcement frame for indicating DF sounding.

FIG. 10 illustrates a null data packet announcement (NDPA) frame 1010 for indicating DF sounding. There are various ways for AP to indicate the DF sounding packets to STA. In the embodiment of FIG. 10, NDPA frame 1010 is used to indicate that the immediate subsequent transmission of NDP(s) 1020 is a DF sounding packet(s). NDPA frame 1010 comprises a field for group ID and/or partial AID (PAID). In one example, the group ID is set to a predetermined value (known to STAs) to indicate the DF sounding packets. Alternately, partial AID can be set to a pre-determined value (known to STAs) based on unassigned AID. Another way to indicate the DF sounding packets is via the FTM ranging procedure. For example, an FTM request or any other FTM frame may be used for DF sounding. AID is an abbreviation of "association ID", which is used to identify the station for delivery.

Figure 11:
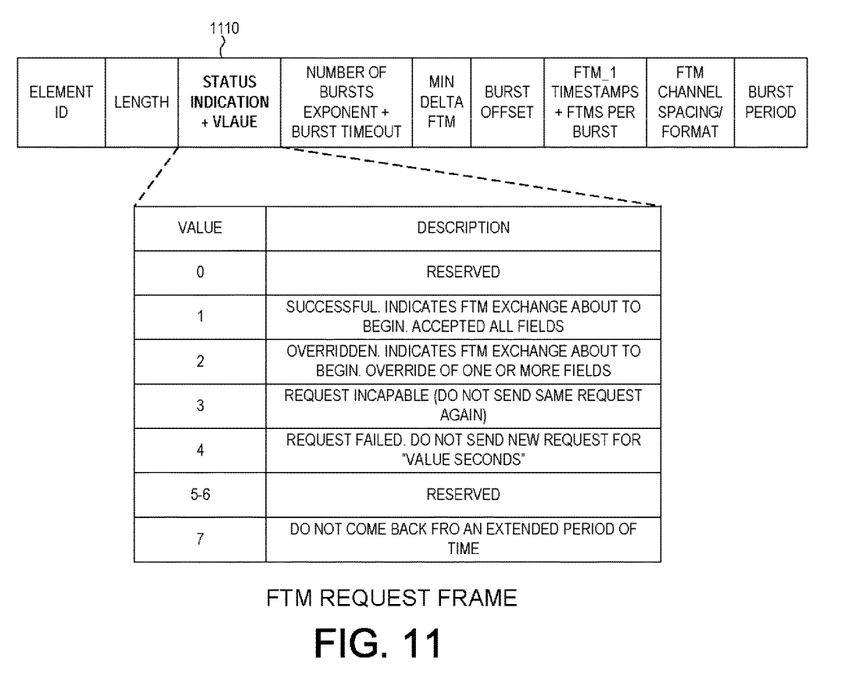
FIG. 11 illustrates a fine-timing measurement (FTM) request for indicating DF sounding.

FIG. 11 illustrates a fine-timing measurement (FTM) request frame 1110 for indicating DF sounding. In one embodiment, FTM request frame 1110 comprises a status indication field. The status indication field can be set to a predefined value to indicate the subsequent DF sounding frames. In the example of FIG. 11, STA uses a reserved value of Status Indication in FTM request 1110 to request the AP to provide AoA ($\phi$, $\theta$) estimate.

Figure 12:
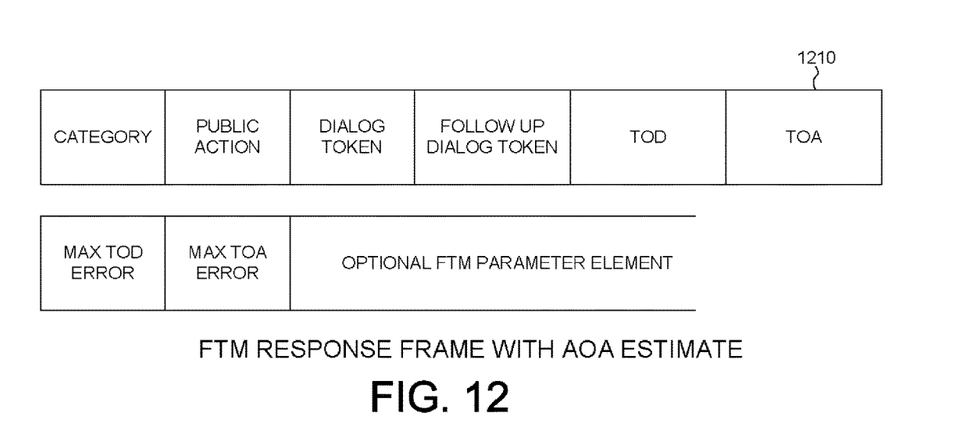
FIG. 12 illustrates a fine-timing measurement (FTM) response for reporting AoA.

FIG. 12 illustrates a fine-timing measurement (FTM) response frame 1210 for reporting AoA. In response to the FTM request that containing an AoA request, the AP transfers the AoA ($\phi$, $\theta$) estimate in a subsequent FTM frame 1210 using Optional FTM Parameter Element. This way, the DF position based on AoA can be embedded into and combined with an FTM ranging procedure.

Figure 13:
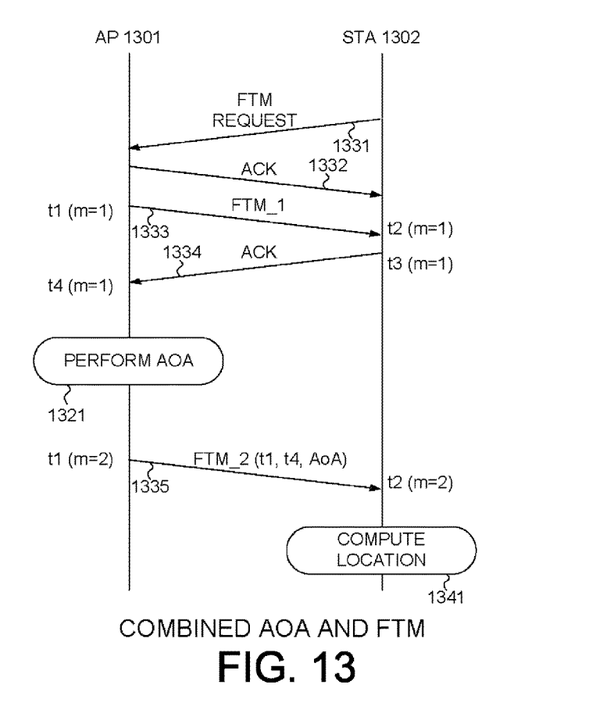
FIG. 13 illustrates a procedure of combined AoA direction finding positioning and FTM ranging.

FIG. 13 illustrates a procedure of combined AoA direction finding positioning and FTM ranging. In step 1331, STA 1302 initiates an FTM procedure by sending an FTM request to AP 1301. In the FTM request, the Status Indication field is set to a predefined value to request AP 1301 to provide AoA estimate. In step 1332, AP 1301 accepts the FTM request and sends an ACK frame back to STA 1302. In step 1333, AP 1301 transmits a first FTM measurement frame FTM_1 at time instance t1 (m=1). STA 1302 receives FTM_1 at time instance t2 (m=1). In step 1334, STA 1302 transmits an ACK frame to AP 1301 at time instance t3 (m=1). AP 1301 receives the ACK frame at time instance t4 (m=1). AP 1301 receives the ACK frame from its multiple antennas and performs AoA in step 1321. In step 1335, AP 1301 transmits a second FTM measurement frame FTM_2 at time instance t1 (m=2). FTM_2 payload also includes the timestamps t1, t4, and AoA of the first measurement session. STA 1302 receives FTM_2 at time instance t2 (m=2). Based on the FTM measurement results, STA 1302 computes the time-of-flight (TOF) or Round Trip Delay (RTD/2) and its corresponding range/distance to AP 1301. In addition, because STA 1302 requests AoA estimate in its FTM request, AP 1301 sends the AoA ($\phi$, $\theta$) in one of the FTM frames (FTM_2). As a result, STA 1302 has both AoA estimate and distance information, which can be used to determine its location in step 1341. Combining AoA with FTM is especially useful when the AoA radio resolution error is too high, which happens when the STA is out of the AoA service area, or when the STA offset angle S relative to the AP antenna boresight is large.

Figure 14:
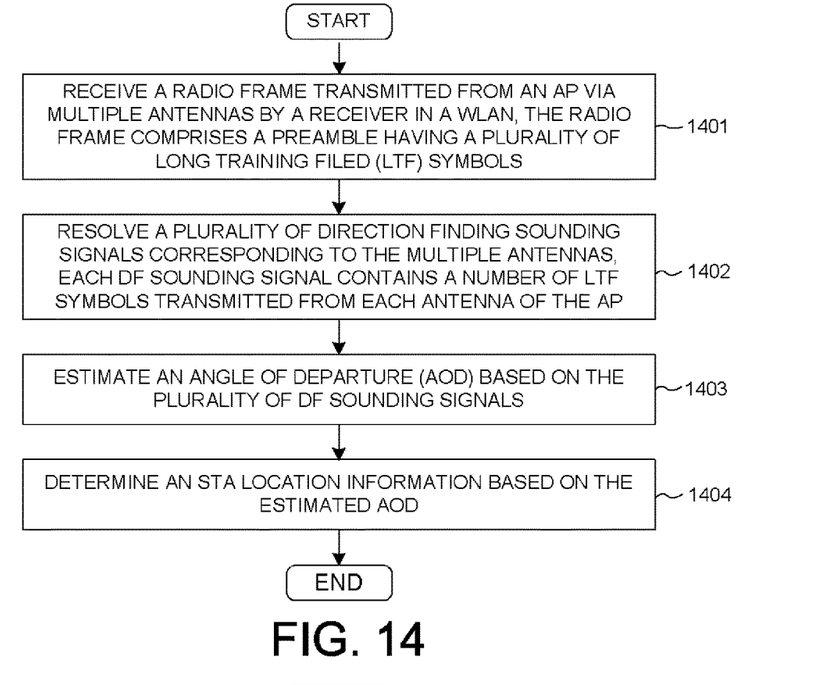
FIG. 14 is a flow chart of a method of direction finding positioning based on AoD from station perspective in accordance with one novel aspect.

FIG. 14 is a flow chart of a method of direction finding positioning based on AoD from receiving station perspective in accordance with one novel aspect. In step 1401, a receiving station (e.g., non-AP station) receives a radio frame transmitted from a transmitting station (e.g., AP station) via multiple antennas in a WLAN. The radio frame comprises a preamble having a plurality of long training field (LTF) symbols. In step 1402, the non-AP STA resolves a plurality of direction finding (DF) sounding signals corresponding to the multiple antennas. Each DF sounding signal contains a number of LTF symbols transmitted from each antenna of the AP station. In step 1403, the non-AP STA estimates an angle of departure (AoD) based on the plurality of DF sounding signals. In step 1404, the non-AP STA determines its location information based on the estimated AoD.

In one embodiment, non-pilot tones of each LTF symbol from each antenna is multiplied by an entry of a corresponding row vector of a P matrix for transmission, wherein the P matrix contains orthogonal row vectors, wherein the number of entries in each row vector is equal to the number of LFT symbols. The DF sounding signal from each antenna is resolved by an inner product of a corresponding row vector of the P matrix and the received LTF symbols. In another embodiment, each LTF symbol contains groups of interleaving subcarrier tones, and wherein different groups of subcarrier tones are allocated to different antennas to form an interleaved LTF waveform for transmission. Each DF sounding signal is resolved by processing a corresponding group of subcarrier tones to extract the DF sounding signal transmitted from each antenna.

Figure 15:
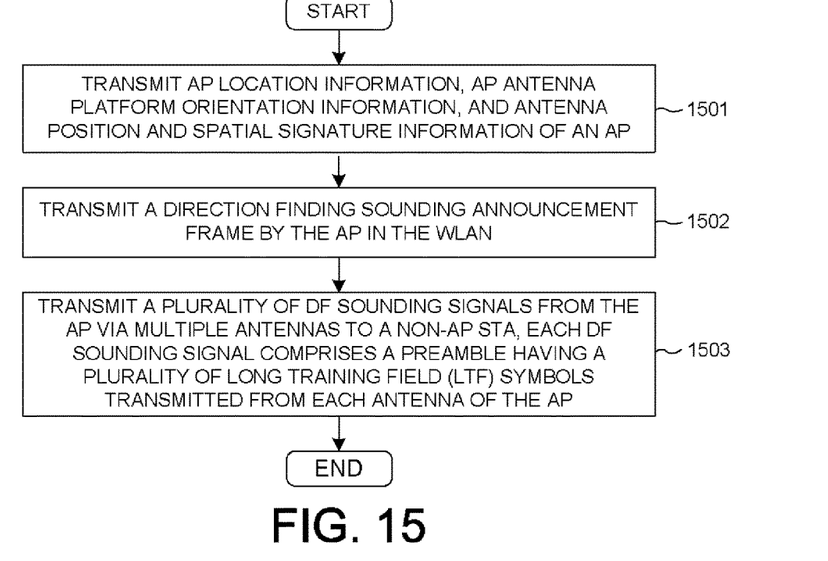
FIG. 15 is a flow chart of a method of direction finding positioning based on AoD from AP perspective in accordance with one novel aspect.

FIG. 15 is a flow chart of a method of direction finding positioning based on AoD from transmitting station perspective in accordance with one novel aspect. In step 1501, a transmitting station (e.g., AP station) transmits AP location information, AP antenna platform orientation information, and antenna position and/or spatial signature information in a WLAN. In step 1502, the AP station transmits a direction finding (DF) sounding announcement frame in the WLAN. In step 1503, the AP station transmits a plurality of DF sounding signals via multiple antennas to a receiving station (e.g., non-AP station). Each DF sounding signal comprises a preamble having a plurality of long training field (LTF) symbols transmitted from each antenna of the AP station.

Figure 16:
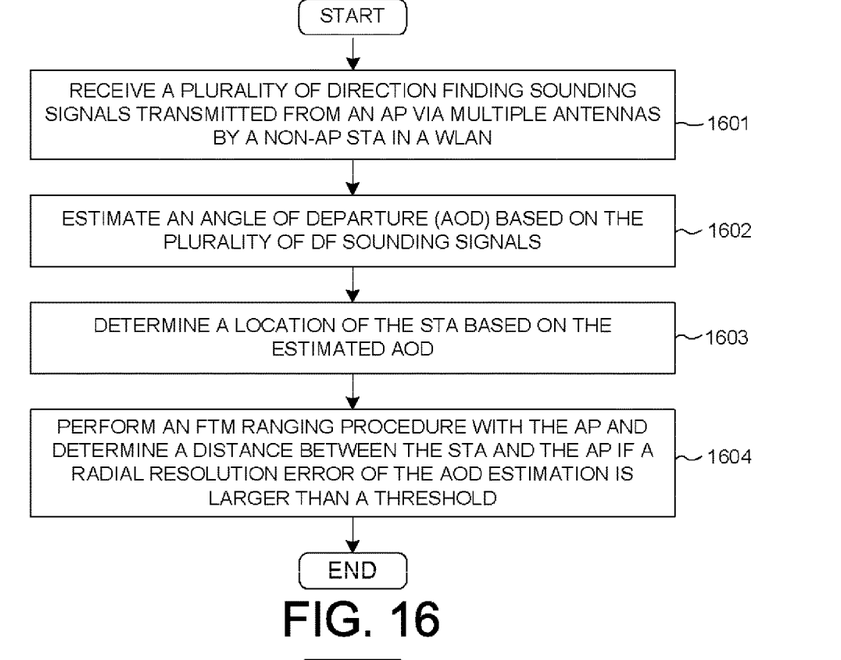
FIG. 16 is a flow chart of a method of combined AoD direction finding positioning and FTM ranging in accordance with one novel aspect.

FIG. 16 is a flow chart of a method of combined AoD direction finding positioning and FTM ranging in accordance with one novel aspect. In step 1601, a receiving station (e.g., non-AP STA) receives a plurality of DF sounding signals transmitted from a transmitting station (e.g., AP) via multiple antennas in a WLAN. In step 1602, the STA estimates an angle of departure (AoD) based on the plurality of DF sounding signals. In step 1603, the STA determines a location of the STA based on the estimated AoD. In step 1604, the STA performs an FTM ranging procedure with the AP and determines a distance between the STA and the AP if a radial resolution error of the AoD is larger than a threshold.

The decision that the radial resolution error of AoD is larger than a threshold can be determined based on: 1) RSSI (received signal strength indicator); 2) range estimate obtained by FTM ranging; or 3) solved AoD estimate. In one alternative embodiment, the non-AP performs FTM ranging before the AoA. The FTM frames during the FTM ranging contain multiple long training field (LTF) symbols for the subsequent AoD estimate. The subsequent AoD is indicated by an indicator in an FTM frame set to a pre-determined value.

Figure 17:
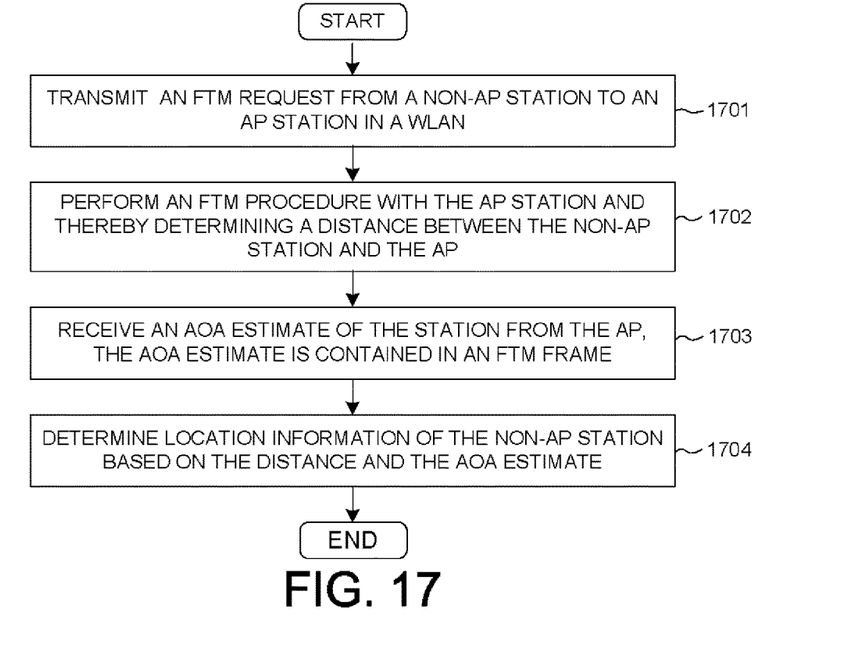
FIG. 17 is a flow chart of a method of combined AoA direction finding positioning and FTM ranging in accordance with one novel aspect.

FIG. 17 is a flow chart of a method of combined AoA direction finding positioning and FTM ranging in accordance with one novel aspect. In step 1701, a non-AP STA transmits an FTM request to an AP in a WLAN. In step 1702, the non-AP STA performs an FTM ranging procedure with the AP to determine a distance between the STA and the AP. In step 1703, the STA receives an angle of arrival (AoA) estimate of the STA from the AP, and the AoA estimate is contained in an FTM frame during the FTM procedure. In step 1704, the non-AP STA determines location information of the non-AP STA based on the distance and the AoA estimate. In one embodiment, the FTM request comprises an indication field of a predefined value to request the AP to provide the AoA of the non-AP station.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a radio frame transmitted from a wireless transmitting station via multiple antennas by a receiver in a wireless local area network (WLAN), wherein the radio frame comprise a preamble having a plurality of long training field (LTF) symbols;
   (b) resolving a plurality of direction finding (DF) sounding signals corresponding to the multiple antennas, wherein each DF sounding signal contains a number of LTF symbols transmitted from each antenna of the transmitting station;
   (c) estimating an angle of departure (AoD) based on the plurality of DF sounding signals; and
   (d) determining receiving station location information based on the estimated AoD;
   wherein non-pilot tones of each LTF symbol from each antenna is multiplied by an entry of a corresponding row vector of a matrix for transmission, wherein the matrix contains orthogonal row vectors.

2. The method of claim 1, further comprising: obtaining location information, antenna platform orientation information, and antenna position and/or spatial signature information of the transmitting station and the multiple antennas.

3. The method of claim 1, further comprising: receiving a null data packet announcement (NDPA) frame from the transmitting station indicating the immediate subsequent transmission of the DF sounding signals.

4. The method of claim 3, wherein the NDPA frame comprises a specific group ID indicating the immediate subsequent transmission of the DF sounding signals.

5. The method of claim 3, wherein the NDPA frame comprises predefined partial association IDs indicating the immediate subsequent transmission of the DF sounding signals.

6. The method of claim 1, further comprising: receiving a fine-timing measurement (FTM) frame from the transmitting station, wherein an indication field of the FTM frame is set to a predefined value.

7. The method of claim 6, wherein the DF sounding signals is a type of FTM frame.

8. The method of claim 1, wherein the number of entries in each row vector is equal to the number of LFT symbols.

9. The method of claim 1, wherein the DF sounding signal from each antenna is resolved by an inner product of a corresponding row vector of the orthogonal matrix and the received LTF symbols.

10. The method of claim 1, wherein each LTF symbol contains groups of interleaving subcarrier tones, and wherein different groups of subcarrier tones are allocated to different antennas to form an interleaved LTF waveform for transmission.

11. The method of claim 10, wherein each DF sounding signal is resolved by processing a corresponding group of subcarrier tones to extract the DF sounding signal transmitted from each antenna.

12. The method of claim 1, wherein the receiver resolves the DF sounding signals from each antenna and uses a super-resolution or a Bartlett beamforming method to estimate the AoD.

13. The method of claim 1, wherein the receiver resolves the DF sounding signals from each antenna and determining a spatial signature, and wherein the receiver estimates the AoD via finding a best match for the spatial signature from a set of known spatial signatures.

14. A wireless receiving station comprising: a receiver that receives a radio frame transmitted from a wireless transmitting station via multiple antennas in a wireless local area network (WLAN), wherein the radio frame comprises a preamble having a plurality of long training field (LTF) symbols; a signal processing circuit that resolves a plurality of direction finding (DF) sounding signals corresponding to the multiple antennas, wherein each DF sounding signal containing a number of LTF symbols transmitted from each antenna of the transmitting station; an angle of departure (AoD) circuit that estimates an angle of departure (AoD) based on the plurality of DF sounding signals; and a positioning circuit that determines receiving station location information based on the AoD;
   wherein non-pilot tones of each LTF symbol is multiplied by an entry from an orthogonal row vector of a matrix for transmission, and each DF sounding signal is resolved at the receiver by an inner product of a corresponding row vector of the matrix and the received LTF symbol.

15. The station of claim 14, wherein the receiving station obtains location information, antenna platform orientation information, and antenna positions of the transmitting station and the multiple antennas for determining the receiving station location information.

16. The station of claim 14, wherein each LTF symbol contains groups of interleaved subcarrier tones, and wherein different groups of subcarrier tones are allocated to different antennas to form an interleaved LTF waveform for transmission, and wherein each DF sounding signal is resolved by processing a corresponding group of subcarrier tones to extract the DF sounding signal transmitted from each antenna.

17. A method comprising: (a) transmitting a direction finding (DF) sounding announcement frame by a wireless transmitting station in a wireless local area network (WLAN); and (b) transmitting a plurality of DF sounding signals from the wireless transmitting station via multiple antennas to a wireless receiving station, wherein each DF sounding signal comprises a preamble having a plurality of long training field (LTF) symbols, and wherein each DF sounding signal is transmitted from each antenna of the transmitting station;
   wherein non-pilot tones of each LTF symbol is multiplied by an entry from an orthogonal row vector of a matrix for transmission.

18. The method of claim 17, further comprising: transmitting location information, antenna platform orientation information, and antenna position and/or spatial signature information of the transmitting station and the multiple antennas.

19. The method of claim 17, wherein the number of LFT symbols is equal to the number of entries in the row vector.

20. The method of claim 17, wherein each LTF symbol contains groups of interleaved subcarrier tones, and wherein different groups of subcarrier tones are allocated to different antennas to form an interleaved LTF waveform for transmission.

21. The method of claim 17, wherein the DF announcement frame comprises a specific group ID indicating the immediate subsequent DF sounding signals.

22. The method of claim 17, wherein the DF announcement frame is a fine-timing measurement (FTM) frame, and wherein an indication field of the FTM frame is set to a predefined value.

* * * * *